United States Patent
Fadell et al.

(10) Patent No.: US 10,013,999 B1
(45) Date of Patent: Jul. 3, 2018

(54) VOICE-BASED REALTIME AUDIO ATTENUATION

(71) Applicant: Google LLC, Mountain View, CA (US)

(72) Inventors: Anthony Michael Fadell, Woodside, CA (US); Simon Robert Prakash, Los Gatos, CA (US); Michael Kai Morishita, Belmont, CA (US); Shijing Xian, Sunnyvale, CA (US); Chad Seguin, San Jose, CA (US)

(73) Assignee: Google LLC, Mountain View, CA (US)

( * ) Notice: Subject to any disclaimer, the term of this patent is extended or adjusted under 35 U.S.C. 154(b) by 109 days.

(21) Appl. No.: 14/992,766

(22) Filed: Jan. 11, 2016

(51) Int. Cl.
| | |
|---|---|
| H03G 3/20 | (2006.01) |
| G10L 21/034 | (2013.01) |
| G10L 21/0224 | (2013.01) |
| H04R 29/00 | (2006.01) |
| G10L 21/0216 | (2013.01) |

(52) U.S. Cl.
CPC ........ *G10L 21/034* (2013.01); *G10L 21/0224* (2013.01); *H04R 29/004* (2013.01); *G10L 2021/02163* (2013.01); *H04R 2410/05* (2013.01)

(58) Field of Classification Search
CPC ........... H04M 1/72558; H04M 1/7253; H04M 1/6066; H04M 1/72569; H04M 2250/02; H04M 2250/12; H04M 1/05; H04M 1/72583; H04M 1/72597; H04M 1/6091; H04M 1/656; H04M 1/72502; H04M 1/72519; H04M 1/72522; H04M 1/72527; H04M 1/72563
USPC ..... 381/57, 58, 59, 309, 313, 317, 328, 362, 381/367, 370, 376, 385
See application file for complete search history.

(56) References Cited

U.S. PATENT DOCUMENTS

| | | | |
|---|---|---|---|
| 4,941,187 A | 7/1990 | Slater | |
| 7,920,903 B2 * | 4/2011 | Ueda | H04M 1/6066 455/569.1 |
| 8,594,743 B2 * | 11/2013 | Sano | H04M 1/6058 381/111 |
| 9,571,652 B1 * | 2/2017 | Zeppenfeld | H04M 3/523 |
| 9,628,893 B2 * | 4/2017 | Stevens | H04R 1/1041 |

(Continued)

FOREIGN PATENT DOCUMENTS

WO 2014161091 A1 10/2014

OTHER PUBLICATIONS

Automatic Adjustment of Volume in Response to External Noise and Speech, Sep. 3, 2014, 3 pages, ip.com.

*Primary Examiner* — Akelaw Teshale
(74) *Attorney, Agent, or Firm* — McDonnell Boehnen Hulbert & Berghoff LLP; Michael D. Clifford (57) ABSTRACT

An example implementation may involve driving an audio output module of a wearable device with a first audio signal and then receiving, via at least one microphone of wearable device, a second audio signal comprising first ambient noise. The device may determine that the first ambient noise is indicative of user speech and responsively duck the first audio signal. While the first audio signal is ducked, the device may detect, in a subsequent portion of the second audio signal, second ambient noise, and determine that the second ambient noise is indicative of ambient speech. Responsive to the determination that the second ambient noise is indicative of ambient speech, the device may continue the ducking of the first audio signal.

21 Claims, 7 Drawing Sheets

(56) References Cited

U.S. PATENT DOCUMENTS

| | | | |
|---|---|---|---|
| 2006/0132382 A1* | 6/2006 | Jannard | G02C 11/06 345/8 |
| 2006/0153398 A1 | 7/2006 | Deetz et al. | |
| 2008/0298613 A1* | 12/2008 | Slamka | H04M 1/05 381/311 |
| 2014/0126733 A1* | 5/2014 | Gauger, Jr. | G10K 11/178 381/71.6 |
| 2014/0270200 A1* | 9/2014 | Usher | H04R 1/1041 381/57 |
| 2015/0222977 A1* | 8/2015 | Angel, Jr. | H04R 1/105 381/74 |
| 2015/0263688 A1 | 9/2015 | Nicolino, Jr. | |

* cited by examiner

VOICE-BASED REALTIME AUDIO ATTENUATION

BACKGROUND

"Ducking" is a term used in audio track mixing in which a background track (e.g., a music track), is attenuated when another track, such as a voice track, is active. Ducking allows the voice track to dominate the background music and thereby remain intelligible over the music. In another typical ducking implementation, audio content featuring a foreign language (e.g., in a news program) may be ducked while the audio of a translation is played simultaneously over the top of it. In these situations, the ducking is performed manually, typically as a post-processing step.

Some applications of audio ducking also exist that may be implemented in realtime. For example, an emergency broadcast system may duck all audio content that is being played back over a given system, such as broadcast television or radio, in order for the emergency broadcast to be more clearly heard. As another example, the audio playback system(s) in a vehicle, such as an airplane, may be configured to automatically duck the playback of audio content in certain situations. For instance, when the pilot activates an intercom switch to communicate with the passengers on the airplane, all audio being played back via the airplane's audio systems may be ducked so that the captain's message may be heard.

In some computing devices, especially portable devices such as smartphones and tablets, audio ducking is initiated when notifications or other communications are delivered by the device. For instance, a smartphone that is playing back audio content via an audio source may duck the audio content playback when a phone call is incoming. This may allow the user to perceive the phone call without missing it.

Some audio playback sources also provide for an automatic increase in the volume of audio content, based on a determination of ambient noise. For example, many cars have audio playback systems that will automatically increase their volume level in response to increased noise from the car's engine.

Modern headphones, earbuds, and other portable devices with audio playback functions are commonly worn or used over extended periods and in a variety of environments and situations. In some cases, a user may benefit from the private audio experience, listening to music and other audio content independently of ambient noise, including other people. Some headphones provide noise-cancelling functionality, where outward-facing microphones and associated processing detect and analyze the incoming ambient noise, and then generate sound waves that interfere with the ambient noise.

However the desire for a private and isolated audio experience can quickly shift to a desire to regain ambient awareness, for example, when a user is listening to music but then wants to speak to a person around her. In these situations, the audio playback actually degrades the user's ability to clearly hear the person she wants to converse with. The user must either manipulate the volume or play/pause buttons to attenuate or stop the music, remove the device from their head (for a wearable device), or both. In some noise-cancelling headphones, the user may select a manual switch that modifies the noise-cancelling feature to provide a noise pass-through effect. After the conversation is finished, the user must put the device on her head again, and/or manually start the music or raise the volume again. In short, the transition from private audio experience to real-world interaction can be repetitive and cumbersome.

SUMMARY

The present disclosure generally relates to a wearable device that may, while playing back audio content, automatically recognize when a user is engaging in a conversation, and then duck the audio content playback accordingly, in real-time. This may improve the user's experience by reducing or eliminating the need to manipulate the volume controls of the device when transitioning between private listening and external interactions, such as a conversation.

A first example implementation may include (i) driving an audio output module of a wearable device with a first audio signal; (ii) receiving, via at least one microphone of the wearable device, a second audio signal including first ambient noise; (iii) determining that the first ambient noise is indicative of user speech; (iv) responsive to the determination that the first ambient noise is indicative of user speech, ducking the first audio signal; (v) while the first audio signal is ducked, detecting, in a subsequent portion of the second audio signal, second ambient noise; (vi) determining that the second ambient noise is indicative of ambient speech; and (vii) responsive to the determination that the second ambient noise is indicative of ambient speech, continuing the ducking of the first audio signal.

A second example implementation may include a wearable device having (i) an audio output module; (ii) at least one microphone; (iii) a processor; (iv) a non-transitory computer readable medium; and (v) program instructions stored on the non-transitory computer readable medium that, when executed by the processor, cause the wearable device to perform operations including: (a) driving the audio output module with a first audio signal; (b) receiving, via the at least one microphone, a second audio signal including first ambient noise; (c) determining that the first ambient noise is indicative of user speech; (d) responsive to the determination that the first ambient noise is indicative of user speech, ducking the first audio signal; (e) while the first audio signal is ducked, detecting, in a subsequent portion of the second audio signal, second ambient noise; (0 determining that the second ambient noise is indicative of ambient speech; and (g) responsive to the determination that the second ambient noise is indicative of ambient speech, continuing the ducking of the first audio signal.

A third example implementation of a robotic foot may include a non-transitory computer readable media having instructions stored thereon for (i) driving an audio output module of a wearable device with a first audio signal; (ii) receiving, via at least one microphone of the wearable device, a second audio signal including first ambient noise; (iii) determining that the first ambient noise is indicative of user speech; (iv) responsive to the determination that the first ambient noise is indicative of user speech, ducking the first audio signal; (v) while the first audio signal is ducked, detecting, in a subsequent portion of the second audio signal, second ambient noise; (vi) determining that the second ambient noise is indicative of ambient speech; and (vii) responsive to the determination that the second ambient noise is indicative of ambient speech, continuing the ducking of the first audio signal.

A fourth example implementation may include a system having means for performing operations in accordance with the first example implementation.

These as well as other aspects, advantages, and alternatives will become apparent to those of ordinary skill in the

DETAILED DESCRIPTION

Example implementations are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. Overview

Example implementations relate to a wearable device that may, while playing back audio content, automatically recognize when a user is engaging in a conversation, and then duck the audio content playback accordingly, in real-time. The device may be, for example, a wearable device with both an audio playback module as well as one or more microphones for detecting ambient noise. The wearable device may be configured to detect ambient noise via the microphone(s) and then determine that the ambient noise is indicative of the user's speech via spectral analysis, magnitude analysis, and/or beamforming, among other possibilities. Based on the detected speech, the wearable device may duck playback of the audio content by, for example, lowering the volume of the audio content.

The wearable device may distinguish speech from other environmental sounds based on an analysis of the frequency and timing of the ambient noise. The detection of the ambient noise may have a directional component as well. For instance, in some examples, the microphone(s) may be part of a microphone array that directs a listening beam toward a mouth of the user when the wearable device is worn. By basing the initiation of ducking on the detection of the user's speech, the wearable device may avoid false positive determinations to begin ducking that might be triggered by other speech, for instance, in a crowded location.

However, once the wearable device has initiated ducking based on the indication of the user's speech, the wearable device may continue the ducking of the audio content based on the detection of any ambient speech. Further, ambient speech may be determined based on a lower threshold than user speech, or a modified beam pattern. For example, the required signal-to-noise ratio for user speech may be higher than the required threshold for the wearable device to determine ambient speech. This may allow the wearable device to identify the speech of other persons who are conversing with the user, and continue ducking the audio content accordingly. When the device determines that the conversation has ended, for instance when it detects no ambient speech, it may return the audio content to its original volume.

Further, the wearable device may also engage in automatic volume control that may raise the volume of the audio content when, for example, the ambient noise level is too high and is not indicative of speech. In this way, the wearable device may both raise and lower the volume of audio content being played back in real time, as needed based on the detected ambient noise. As a result, the need for a user to adjust the volume controls of the wearable device based on changes to their surroundings may be reduced.

II. Illustrative Wearable Devices

Systems and devices in which exemplary embodiments may be implemented will now be described in greater detail. However, an exemplary system may also be implemented in or take the form of other devices, without departing from the scope of the invention.

An exemplary embodiment may be implemented in a wearable computing device that facilitates voice-based user interactions. However, embodiments related to wearable devices that do not facilitate voice-based user interactions are also possible. An illustrative wearable device may include an ear-piece with a bone-conduction speaker (e.g., a bone conduction transducer or "BCT"). A BCT may be operable to vibrate the wearer's bone structure at a location where the vibrations travel through the wearer's bone structure to the middle ear, such that the brain interprets the vibrations as sounds. The wearable device may take the form of an earpiece with a BCT, which can be tethered via a wired or wireless interface to a user's phone, or may be a stand-alone earpiece device with a BCT. Alternatively, the wearable device may be a glasses-style wearable device that includes one or more BCTs and has a form factor that is similar to traditional eyeglasses.

Figure 1A:
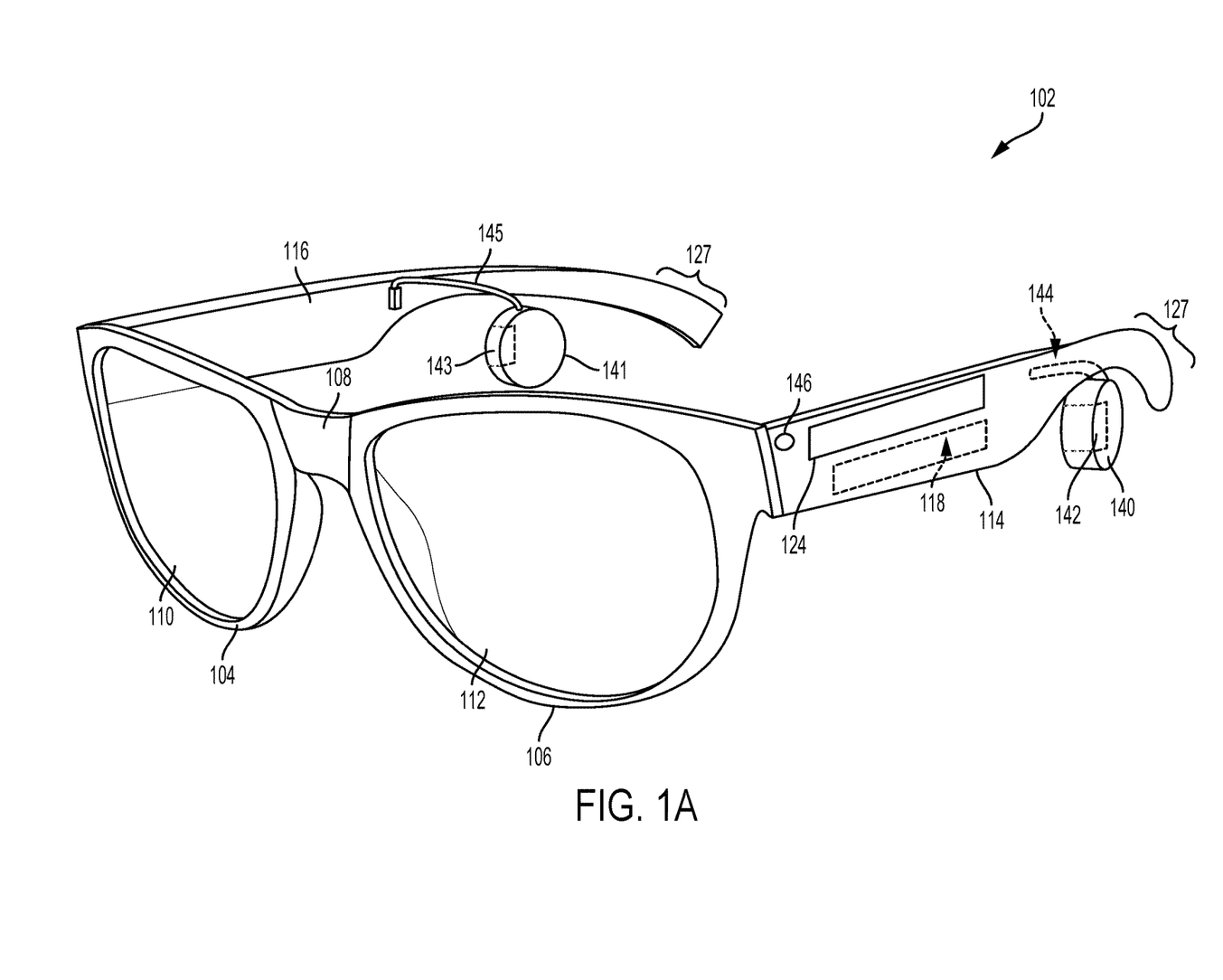
FIG. 1A illustrates a wearable computing device, according to an example embodiment.

FIG. 1A illustrates a wearable computing device 102, according to an exemplary embodiment. In FIG. 1A, the wearable computing device 102 takes the form of glasses-style wearable computing device. Note that wearable computing device 102 may also be considered an example of a head-mountable device (HMD), and thus may also be referred to as an HMD 102. It should be understood, however, that exemplary systems and devices may take the form of or be implemented within or in association with other types of devices, without departing from the scope of the invention. As illustrated in FIG. 1A, the wearable computing device 102 comprises frame elements including lens-frames 104, 106 and a center frame support 108, lens elements 110, 112, and extending side-arms 114, 116. The center frame support 108 and the extending side-arms 114, 116 are configured to secure the wearable computing device 102 to a user's head via placement on a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials are possible as well. Each of the lens elements 110, 112 may also be sufficiently transparent to allow a user to see through the lens element.

The extending side-arms 114, 116 may each be projections that extend away from the lens-frames 104, 106, respectively, and may be positioned behind a user's ears to secure the HMD 102 to the user's head. The extending side-arms 114, 116 may further secure the HMD 102 to the user by extending around a rear portion of the user's head. Additionally or alternatively, for example, the HMD 102 may connect to or be affixed within a head-mountable helmet structure. Other possibilities exist as well.

The HMD 102 may also include an on-board computing system 118 and at least one finger-operable touch pad 124. The on-board computing system 118 is shown to be integrated in side-arm 114 of HMD 102. However, an on-board computing system 118 may be provided on or within other parts of the head-mounted device 102 or may be positioned remotely from and communicatively coupled to a head-mountable component of a computing device (e.g., the on-board computing system 118 could be housed in a separate component that is not head wearable, and is wired or wirelessly connected to a component that is head wearable). The on-board computing system 118 may include a processor and memory, for example. Further, the on-board computing system 118 may be configured to receive and analyze data from a finger-operable touch pad 124 (and possibly from other sensory devices and/or user interface components).

In a further aspect, an HMD 102 may include various types of sensors and/or sensory components. For instance, HMD 102 could include an inertial measurement unit (IMU) (not explicitly shown in FIG. 1A), which provides an accelerometer, gyroscope, and/or magnetometer. In some embodiments, an HMD 102 could also include an accelerometer, a gyroscope, and/or a magnetometer that is not integrated in an IMU.

In a further aspect, HMD 102 may include sensors that facilitate a determination as to whether or not the HMD 102 is being worn. For instance, sensors such as an accelerometer, gyroscope, and/or magnetometer could be used to detect motion that is characteristic of the HMD being worn (e.g., motion that is characteristic of user walking about, turning their head, and so on), and/or used to determine that the HMD is in an orientation that is characteristic of the HMD being worn (e.g., upright, in a position that is typical when the HMD is worn over the ear). Accordingly, data from such sensors could be used as input to an on-head detection process. Additionally or alternatively, HMD 102 may include a capacitive sensor or another type of sensor that is arranged on a surface of the HMD 102 that typically contacts the wearer when the HMD 102 is worn. Accordingly data provided by such a sensor may be used to determine whether or not the HMD is being worn. Other sensors and/or other techniques may also be used to detect when the HMD is being worn.

HMD 102 also includes at least one microphone 146, which may allow the HMD 102 to receive voice commands from a user. The microphone 146 may be a directional microphone or an omni-directional microphone. Further, in some embodiments, an HMD 102 may include a microphone array and/or multiple microphones arranges at various locations on the HMD.

In FIG. 1A, touch pad 124 is shown as being arranged on side-arm 114 of the HMD 102. However, the finger-operable touch pad 124 may be positioned on other parts of the HMD 102. Also, more than one touch pad may be present on the head-mounted device 102. For example, a second touchpad may be arranged on side-arm 116. Additionally or alternatively, a touch pad may be arranged on a rear portion 127 of one or both side-arms 114 and 116. In such an arrangement, the touch pad may arranged on an upper surface of the portion of the side-arm that curves around behind a wearer's ear (e.g., such that the touch pad is on a surface that generally faces towards the rear of the wearer, and is arranged on the surface opposing the surface that contacts the back of the wearer's ear). Other arrangements of one or more touch pads are also possible.

The touch pad 124 may sense the touch and/or movement of a user's finger on the touch pad via capacitive sensing, resistance sensing, or a surface acoustic wave process, among other possibilities. In some embodiments, touch pad 124 may be a one-dimensional or linear touchpad, which is capable of sensing touch at various points on the touch surface, and of sensing linear movement of a finger on the touch pad (e.g., movement forward or backward along the side-arm 124). In other embodiments, touch pad 124 may be a two-dimensional touch pad that is capable of sensing touch in any direction on the touch surface. Additionally, in some embodiments, touch pad 124 may be configured for near-touch sensing, such that the touch pad can sense when a user's finger is near to, but not in contact with, the touch pad. Further, in some embodiments, touch pad 124 may be capable of sensing a level of pressure applied to the pad surface.

In a further aspect, earpiece 140 and 141 are attached to side-arms 114 and 116, respectively. Earpieces 140 and 141 can each include a BCT 142 and 143, respectively. Each earpiece 140, 141 may be arranged such that when the HMD 102 is worn, each BCT 142, 143 is positioned to the posterior of a wearer's ear. For instance, in an exemplary embodiment, an earpiece 140, 141 may be arranged such that a respective BCT 142, 143 can contact the auricle of both of the wearer's ear. Other arrangements of earpieces 140, 141 are also possible. Further, embodiments with a single earpiece 140 or 141 are also possible.

In an exemplary embodiment, a BCT, such as BCT 142 and/or BCT 143, may operate as a bone-conduction speaker. For instance, a BCT may be implemented with a vibration transducer that is configured to receive an audio signal and to vibrate a wearer's bone structure in accordance with the audio signal. More generally, it should be understood that any component that is arranged to vibrate a wearer's bone structure may be incorporated as a bone-conduction speaker, without departing from the scope of the invention.

In a further aspect, HMD 102 may include at least one audio source (not shown) that is configured to provide an audio signal that drives BCT 142 and/or BCT 143. For instance, in an exemplary embodiment, an HMD 102 may include an internal audio playback device such as an on-board computing system 118 that is configured to play digital audio files. Additionally or alternatively, an HMD 102 may include an audio interface to an auxiliary audio playback device (not shown), such as a portable digital audio player, a smartphone, a home stereo, a car stereo, and/or a personal computer, among other possibilities. In some embodiments, an application or software-based interface may allow for the HMD 102 to receive an audio signal that is streamed from another computing device, such as the user's mobile phone. An interface to an auxiliary audio playback device could additionally or alternatively be a tip, ring, sleeve (TRS) connector, or may take another form. Other audio sources and/or audio interfaces are also possible.

Further, in an embodiment with two ear-pieces 140 and 141, which both include BCTs, the ear-pieces 140 and 141 may be configured to provide stereo audio. However, non-stereo audio is also possible in devices that include two ear-pieces.

Figure 1B:
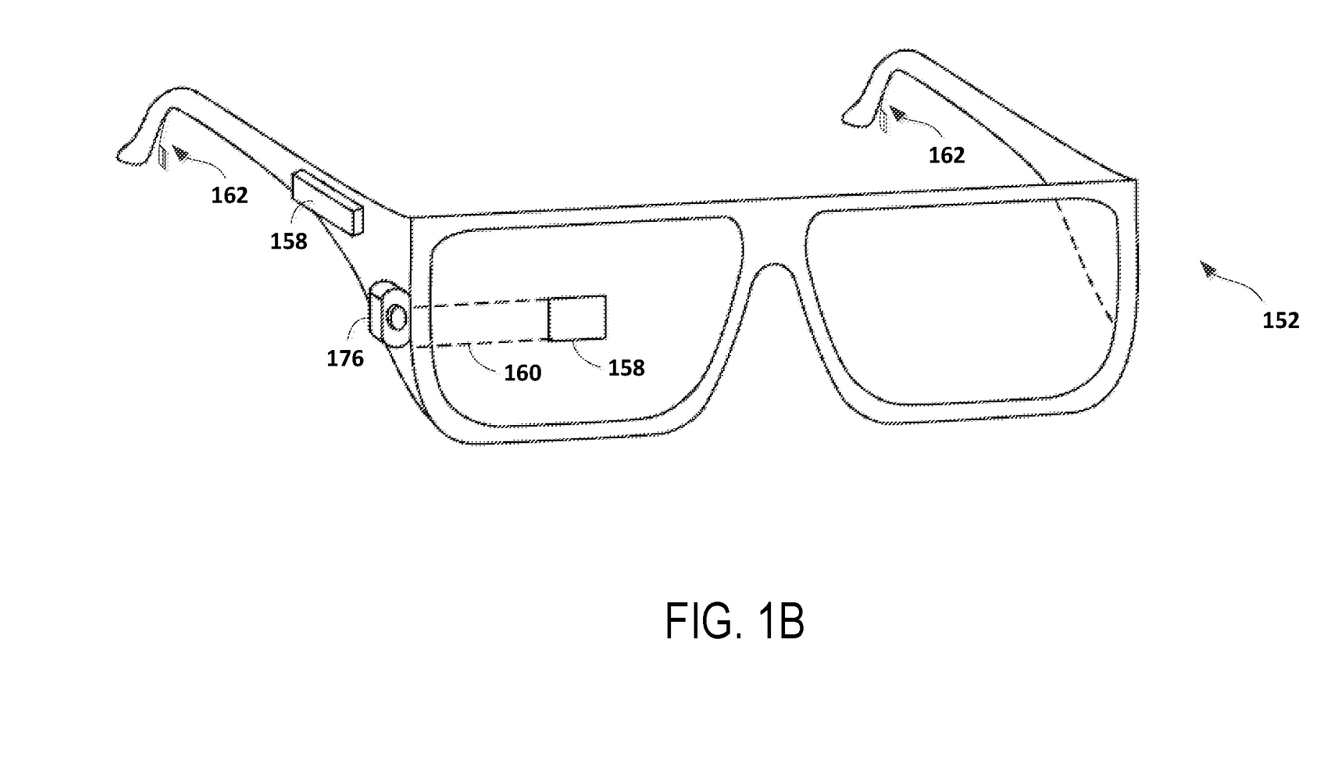
FIG. 1B shows another wearable computing device, according to an example embodiment.

Note that in the example shown in FIG. 1A, HMD 102 does not include a graphical display. FIG. 1B shows another wearable computing device 152 according to an example embodiment, which is similar to the HMD shown in FIG. 1B but includes a graphical display. In particular, the wearable computing device shown in FIG. 1B takes the form of a glasses-style HMD 152 with a near-eye display 158. As shown, HMD 152 may include BCTs 162 that is configured and functions similarly to BCTs 142 and 143, an onboard computing system 158 that is configured and functions similarly to onboard computing system 118, and a microphone 176 that is configured and functions similarly to microphone 146. HMD 152 may additionally or alternatively include other components, which are not shown in FIG. 1B.

HMD 152 includes a single graphical display 158, which may be coupled to the on-board computing system 158, to a standalone graphical processing system, and/or to other components of HMD 152. The display 158 may be formed on one of the lens elements of the HMD 152, such as a lens element described with respect to FIG. 1A, and may be configured to overlay computer-generated graphics in the wearer's field of view, while also allowing the user to see through the lens element and concurrently view at least some of their real-world environment. (Note that in other embodiments, a virtual reality display that substantially obscures the user's view of the physical world around them is also possible.) The display 158 is shown to be provided in a center of a lens of the HMD 152, however, the display 158 may be provided in other positions, and may also vary in size and shape. The display 158 may be controllable via the computing system 154 that is coupled to the display 158 via an optical waveguide 160.

Other types of near-eye displays are also possible. For example, a glasses-style HMD may include one or more projectors (not shown) that are configured to project graphics onto a display on an inside surface of one or both of the lens elements of HMD. In such a configuration, the lens element(s) of the HMD may act as a combiner in a light projection system and may include a coating that reflects the light projected onto them from the projectors, towards the eye or eyes of the wearer. In other embodiments, a reflective coating may not be used (e.g., when the one or more projectors take the form of one or more scanning laser devices).

As another example of a near-eye display, one or both lens elements of a glasses-style HMD could include a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame of the HMD for driving such a matrix display. Alternatively or additionally, a laser or LED source and scanning system could be used to draw a raster display directly onto the retina of one or more of the user's eyes. Other types of near-eye displays are also possible.

Generally, it should be understood that an HMD and other types of wearable devices may include other types of sensors and components, in addition or in the alternative to those described herein. Further, variations on the arrangements of sensory systems and components of an HMD described herein, and different arrangements altogether, are also possible.

Figure 2A:
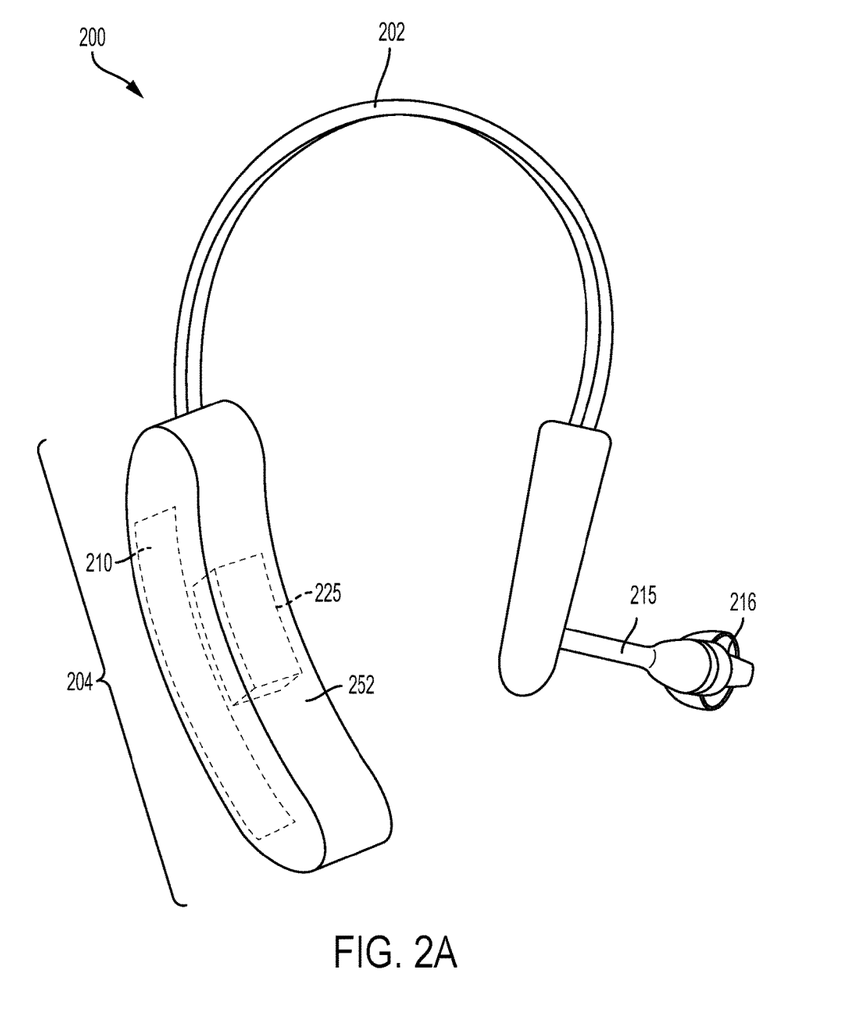
FIGS. 2A to 2C show yet another wearable computing device, according to an example embodiment.
Figure 2B:
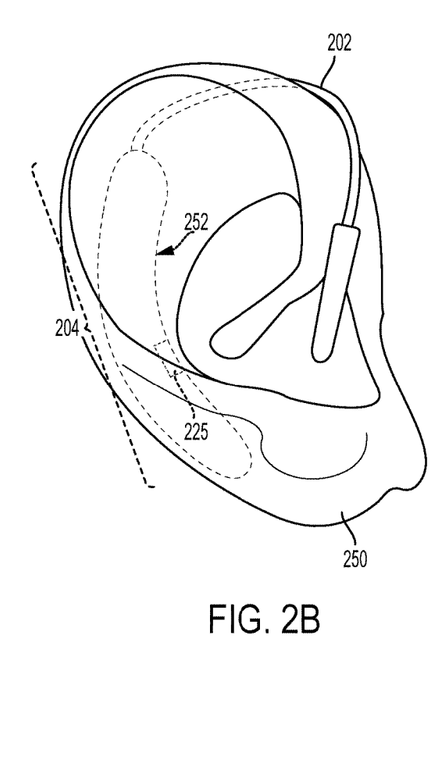
Figure 2C:
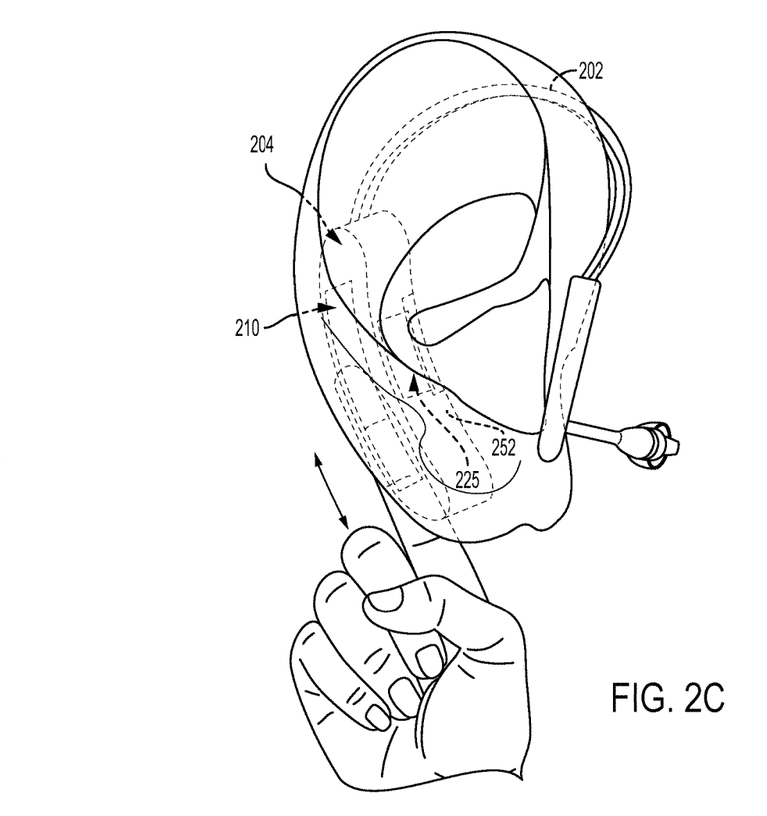

FIGS. 2A to 2C show another wearable computing device according to an example embodiment. More specifically, FIGS. 2A to 2C shows an earpiece device 200, which includes a frame 202 and a behind-ear housing 204. As shown in FIG. 2B, the frame 202 is curved, and is shaped so as to hook over a wearer's ear 250. When hooked over the wearer's ear 250, the behind-ear housing 204 is located behind the wearer's ear. For example, in the illustrated configuration, the behind-ear housing 204 is located behind the auricle, such that a surface 252 of the behind-ear housing 204 contacts the wearer on the back of the auricle.

Note that the behind-ear housing 204 may be partially or completely hidden from view, when the wearer of earpiece device 200 is viewed from the side. As such, an earpiece device 200 may be worn more discretely than other bulkier and/or more visible wearable computing devices.

Referring back to FIG. 2A, the behind-ear housing 204 may include a BCT 225, and touch pad 210. BCT 225 may be, for example, a vibration transducer or an electro-acoustic transducer that produces sound in response to an electrical audio signal input. As such, BCT 225 may function as a bone-conduction speaker that plays audio to the wearer by vibrating the wearer's bone structure. Other types of BCTs are also possible. Generally, a BCT may be any structure that is operable to directly or indirectly vibrate the bone structure of the user.

As shown in FIG. 2C, the BCT 225 may be arranged on or within the behind-ear housing 204 such that when the earpiece device 200 is worn, BCT 225 is positioned posterior to the wearer's ear, in order to vibrate the wearer's bone structure. More specifically, BCT 225 may form at least part of, or may be vibrationally coupled to the material that forms, surface 252 of behind-ear housing 204. Further, earpiece device 200 may be configured such that when the device is worn, surface 252 is pressed against or contacts the back of the wearer's ear. As such, BCT 225 may transfer vibrations to the wearer's bone structure via surface 252. Other arrangements of a BCT on an earpiece device are also possible.

As shown in FIG. 2C, the touch pad 210 may arranged on a surface of the behind-ear housing 204 that curves around behind a wearer's ear (e.g., such that the touch pad is generally faces towards the wearer's posterior when the earpiece device is worn). Other arrangements are also possible.

In some embodiments, touch pad 210 may be a one-dimensional or linear touchpad, which is capable of sensing touch at various points on the touch surface, and of sensing linear movement of a finger on the touch pad (e.g., movement upward or downward on the back of the behind-ear housing 204). In other embodiments, touch pad 210 may be a two-dimensional touch pad that is capable of sensing touch in any direction on the touch surface. Additionally, in some embodiments, touch pad 210 may be configured for near-touch sensing, such that the touch pad can sense when a user's finger is near to, but not in contact with, the touch pad. Further, in some embodiments, touch pad 210 may be capable of sensing a level of pressure applied to the pad surface.

In the illustrated embodiment, earpiece device 200 also includes a microphone arm 215, which may extend towards a wearer's mouth, as shown in FIG. 2B. Microphone arm 215 may include a microphone 216 that is distal from the earpiece. Microphone 216 may be an omni-directional microphone or a directional microphone. Further, an array of microphones could be implemented on a microphone arm 215. Alternatively, a bone conduction microphone (BCM), could be implemented on a microphone arm 215. In such an embodiment, the arm 215 may be operable to locate and/or press a BCM against the wearer's face near or on the wearer's jaw, such that the BCM vibrates in response to vibrations of the wearer's jaw that occur when they speak. Note that the microphone arm is 215 is optional, and that other configurations for a microphone are also possible. Further, in some embodiments, ear bud 215 may be a removable component, which can be attached and detached from the earpiece device by the user.

In some embodiments, a wearable device may include two types and/or arrangements of microphones. For instance, the device may include one or more directional microphones arranged specifically to detect speech by the wearer of the device, and one or more omni-directional microphones that are arranged to detect sounds in the wearer's environment (perhaps in addition to the wearer's voice). Such an arrangement may facilitate intelligent processing based on whether or not audio includes the wearer's speech.

In some embodiments, a wearable device may include an ear bud (not shown), which may function as a typical speaker and vibrate the surrounding air to project sound from the speaker. Thus, when inserted in the wearer's ear, the wearer may hear sounds in a discrete manner. Such an ear bud is optional, and may be implemented by a removable (e.g., modular) component, which can be attached and detached from the earpiece device by the user.

Figure 3:
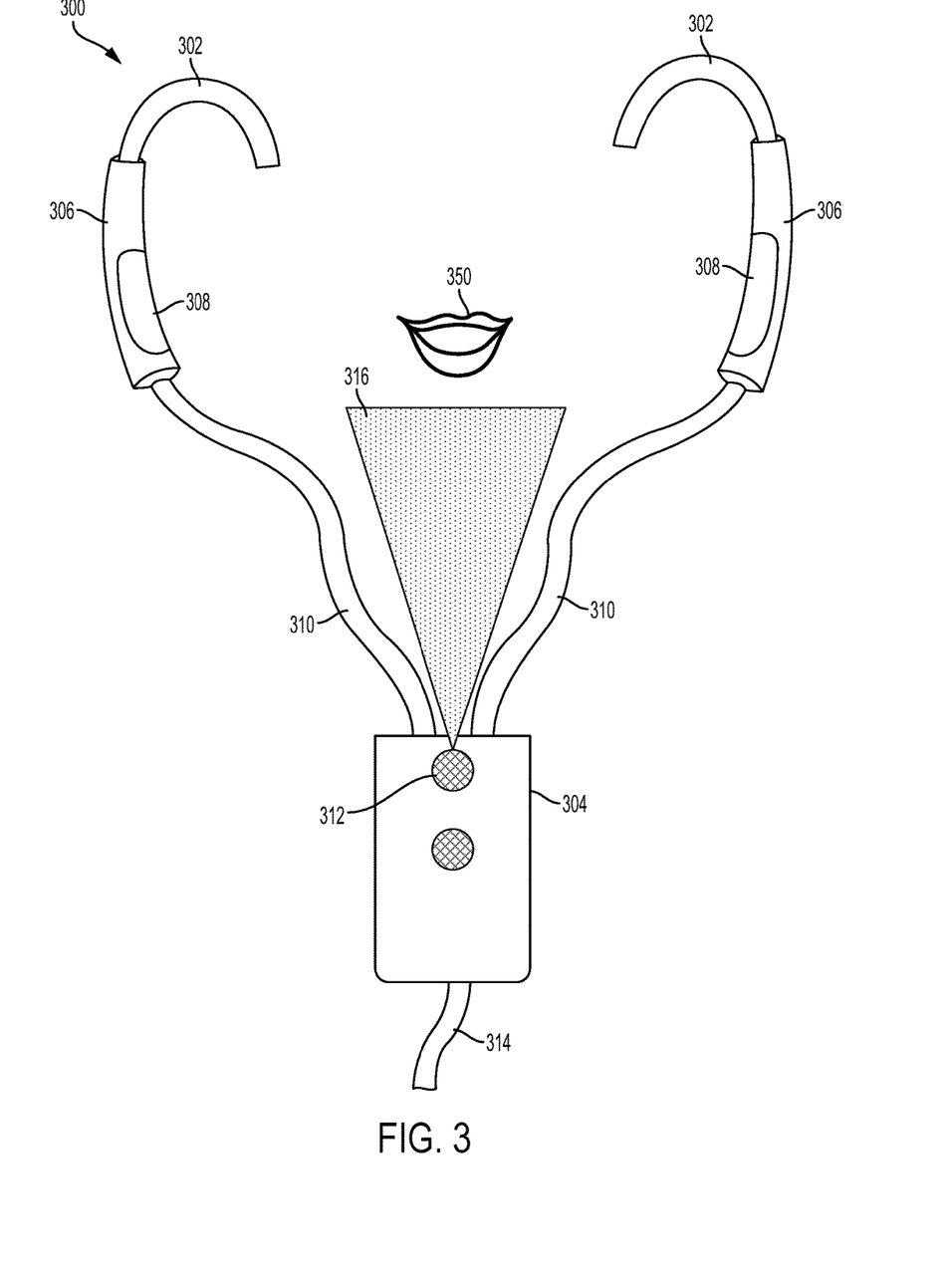
FIG. 3 shows yet another wearable computing device, according to an example embodiment.

FIG. 3 shows another wearable computing device 300 according to an example embodiment. The device 300 includes two frame portions 302 shaped so as to hook over a wearer's ears. When worn, a behind-ear housing 306 is located behind each of the wearer's ears. The housings 306 may each include a BCT 308. BCT 308 may be, for example, a vibration transducer or an electro-acoustic transducer that produces sound in response to an electrical audio signal input. As such, BCT 308 may function as a bone-conduction speaker that plays audio to the wearer by vibrating the wearer's bone structure. Other types of BCTs are also possible. Generally, a BCT may be any structure that is operable to directly or indirectly vibrate the bone structure of the user.

Note that the behind-ear housing 306 may be partially or completely hidden from view, when the wearer of the device 300 is viewed from the side. As such, the device 300 may be worn more discretely than other bulkier and/or more visible wearable computing devices.

As shown in FIG. 3, the BCT 308 may be arranged on or within the behind-ear housing 306 such that when the device 300 is worn, BCT 308 is positioned posterior to the wearer's ear, in order to vibrate the wearer's bone structure. More specifically, BCT 308 may form at least part of, or may be vibrationally coupled to the material that forms the behind-ear housing 306. Further, the device 300 may be configured such that when the device is worn, the behind-ear housing 306 is pressed against or contacts the back of the wearer's ear. As such, BCT 308 may transfer vibrations to the wearer's bone structure via the behind-ear housing 306. Other arrangements of a BCT on the device 300 are also possible.

In some embodiments, the behind-ear housing 306 may include a touchpad (not shown), similar to the touchpad 210 shown in Figure and described above. Further, the frame 302, behind-ear housing 306, and BCT 308 configuration shown in FIG. 3 may be replaced by ear buds, over-ear headphones, or another type of headphones or micro-speakers. These different configurations may be implemented by removable (e.g., modular) components, which can be attached and detached from the device 300 by the user. Other examples are also possible.

In FIG. 3, the device 300 includes two cords 310 extending from the frame portions 302. The cords 310 may be more flexible than the frame portions 302, which may be more rigid in order to remain hooked over the wearer's ears during use. The cords 310 are connected at a pendant-style housing 304. The housing 304 may contain, for example, one or more microphones 312, a battery, one or more sensors, processing for the device 300, a communications interface, and onboard memory, among other possibilities.

A cord 314 extends from the bottom of the housing 314, which may be used to connect the device 300 to another device, such as a portable digital audio player, a smartphone, among other possibilities. Additionally or alternatively, the device 300 may communicate with other devices wirelessly, via a communications interface located in, for example, the housing 304. In this case, the cord 314 may be removable cord, such as a charging cable.

The microphones 312 included in the housing 304 may be omni-directional microphones or directional microphones. Further, an array of microphones could be implemented. In the illustrated embodiment, the device 300 includes two microphones arranged specifically to detect speech by the wearer of the device. As shown in FIG. 3, the microphones 312 may direct a listening beam 316 toward a location that corresponds to a wearer's mouth 350, when the device 300 is worn. The microphones 312 may also detect sounds in the wearer's environment, such as the ambient speech of others in the vicinity of the wearer. Additional microphone configurations are also possible, including a microphone arm extending from a portion of the frame 302, or a microphone located inline on one or both of the cords 310. Other possibilities also exist.

III. Illustrative Computing Devices

Figure 4:
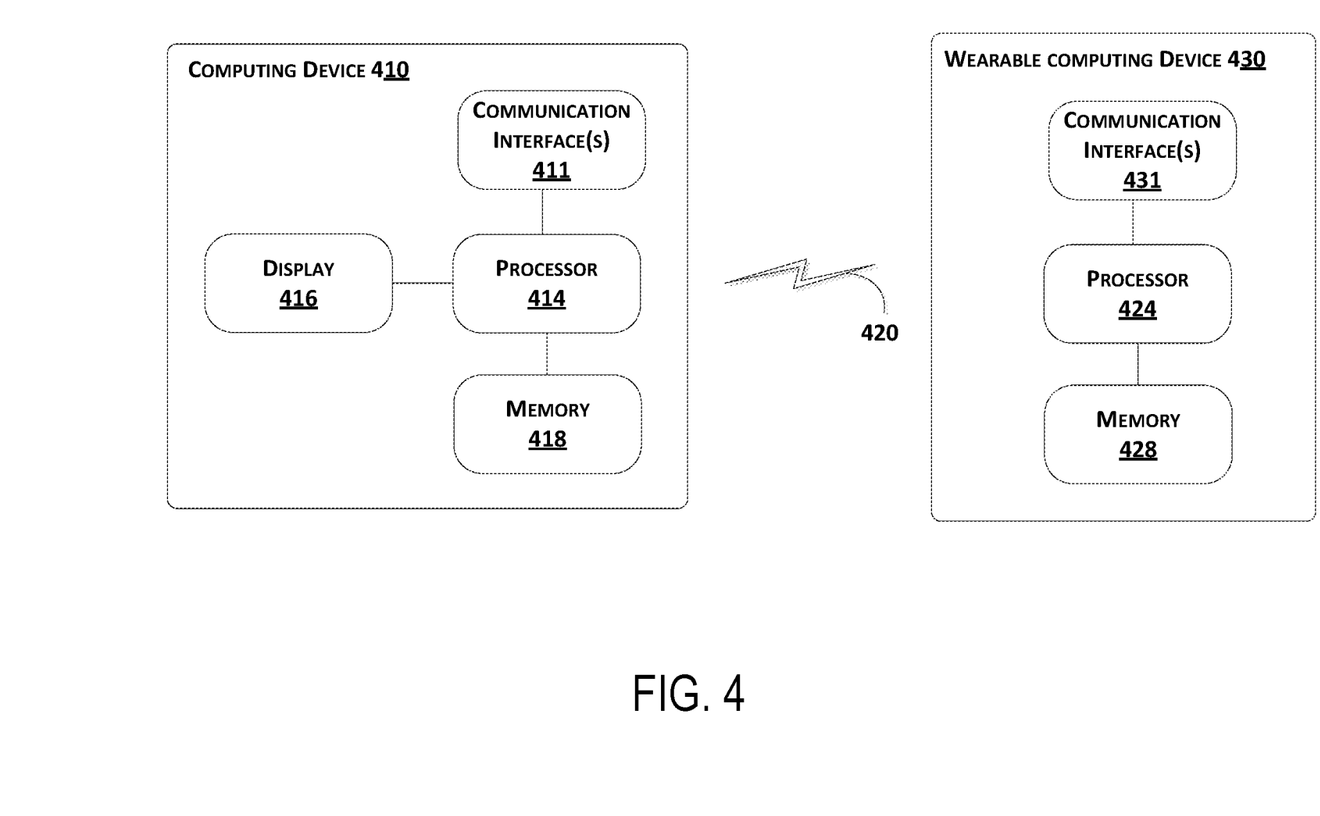
FIG. 4 is a block diagram showing components of a computing device and a wearable computing device, according to an example embodiment

FIG. 4 is a block diagram showing basic components of a computing device 410 and a wearable computing device 430, according to an example embodiment. In an example configuration, computing device 410 and wearable computing device 430 are operable to communicate via a communication link 420 (e.g., a wired or wireless connection). Computing device 410 may be any type of device that can receive data and display information corresponding to or associated with the data. For example, the computing device 410 may be a mobile phone, a tablet computer, a laptop computer, a desktop computer, or an in-car computer, among other possibilities. Wearable computing device 430 may be a wearable computing device such as those described in reference to FIGS. 1A, 1B, 2A, 2B, 2C, and 3, a variation on these wearable computing devices, or another type of wearable computing device altogether.

The wearable computing device 430 and computing device 410 include hardware and/or software to enable communication with one another via the communication link 420, such as processors, transmitters, receivers, antennas, etc. In the illustrated example, computing device 410 includes one or more communication interfaces 411, and wearable computing device 430 includes one or more communication interfaces 431. As such, the wearable computing device 430 may be tethered to the computing device 410 via a wired or wireless connection. Note that such a wired or wireless connection between computing device 410 and wearable computing device 430 may be established directly (e.g., via Bluetooth), or indirectly (e.g., via the Internet or a private data network).

In a further aspect, note that while computing device 410 includes a graphic display system 416, the wearable computing device 430 does not include a graphic display. In such a configuration, wearable computing device 430 may be configured as a wearable audio device, which allows for advanced voice control and interaction with applications running on another computing device 410 to which it is tethered.

As noted, communication link 420 may be a wired link, such as a universal serial bus or a parallel bus, or an Ethernet connection via an Ethernet port. A wired link may also be established using a proprietary wired communication protocol and/or using proprietary types of communication interfaces. The communication link 420 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

As noted above, to communicate via communication link 420, computing device 410 and wearable computing device 430 may each include one or more communication interface(s) 411 and 431 respectively. The type or types of communication interface(s) included may vary according to the type of communication link 420 that is utilized for communications between the computing device 410 and the wearable computing device 430. As such, communication interface(s) 411 and 431 may include hardware and/or software that facilitates wired communication using various different wired communication protocols, and/or hardware and/or software that facilitates wireless communications using various different wired communication protocols.

Computing device 410 and wearable computing device 430 include respective processing systems 414 and 424. Processors 414 and 424 may be any type of processor, such as a micro-processor or a digital signal processor, for example. Note that computing device 410 and wearable computing device 430 may have different types of processors, or the same type of processor. Further, one or both of computing device 410 and a wearable computing device 430 may include multiple processors.

Computing device 410 and a wearable computing device 430 further include respective on-board data storage, such as memory 418 and memory 428. Processors 414 and 424 are communicatively coupled to memory 418 and memory 428, respectively. Memory 418 and/or memory 428 (any other data storage or memory described herein) may be computer-readable storage media, which can include volatile and/or non-volatile storage components, such as optical, magnetic, organic or other memory or disc storage. Such data storage can be separate from, or integrated in whole or in part with one or more processor(s) (e.g., in a chipset). In some implementations, the data storage can be implemented using a single physical device (e.g., one optical, magnetic, organic or other memory or disc storage unit), while in other implementations, the data storage can be implemented using two or more physical devices.

Memory 418 can store machine-readable program instructions that can be accessed and executed by the processor 414. Similarly, memory 428 can store machine-readable program instructions that can be accessed and executed by the processor 424.

In an exemplary embodiment, memory 418 may include program instructions stored on a non-transitory computer-readable medium and executable by the at least one processor to provide a graphical user-interface (GUI) on a graphic display 416. The GUI may include a number of interface elements to adjust lock-screen parameters of the wearable computing device 430 and the computing device 410. These interface elements may include: (a) an interface element for adjustment of an unlock-sync feature, wherein enabling the unlock-sync feature causes the wearable audio device to operate in an unlocked state whenever the master device is in an unlocked state, and wherein disabling the unlock-sync feature allows the wearable audio device to operate in a locked state when the master device is in an unlocked state, and (b) an interface element for selection of a wearable audio device unlock process, wherein the selected wearable audio device unlock process provides a mechanism to unlock the wearable audio device, independent from whether the master device is in the locked state or the unlocked state.

In a further aspect, a communication interface 411 of the computing device 310 may be operable to receive a communication from the wearable audio device that is indicative of whether or not the wearable audio device is being worn. Such a communication may be based on sensor data generated by at least one sensor of the wearable audio device. As such, memory 418 may include program instructions providing an on-head detection module. Such program instructions may to: (i) analyze sensor data generated by a sensor or sensors on the wearable audio device to determine whether or not the wearable audio device is being worn; and (ii) in response to a determination that the wearable audio device is not being worn, lock the wearable audio device (e.g., by sending a lock instruction to the wearable audio device). Other examples are also possible.

IV. Example Implementations of Voice-Based Realtime Audio Attenuation

Example implementations are discussed below involving a wearable device that may, while playing back audio content, automatically recognize when a user is engaging in a conversation, and then duck the audio content playback accordingly, in real-time.

Figure 5:
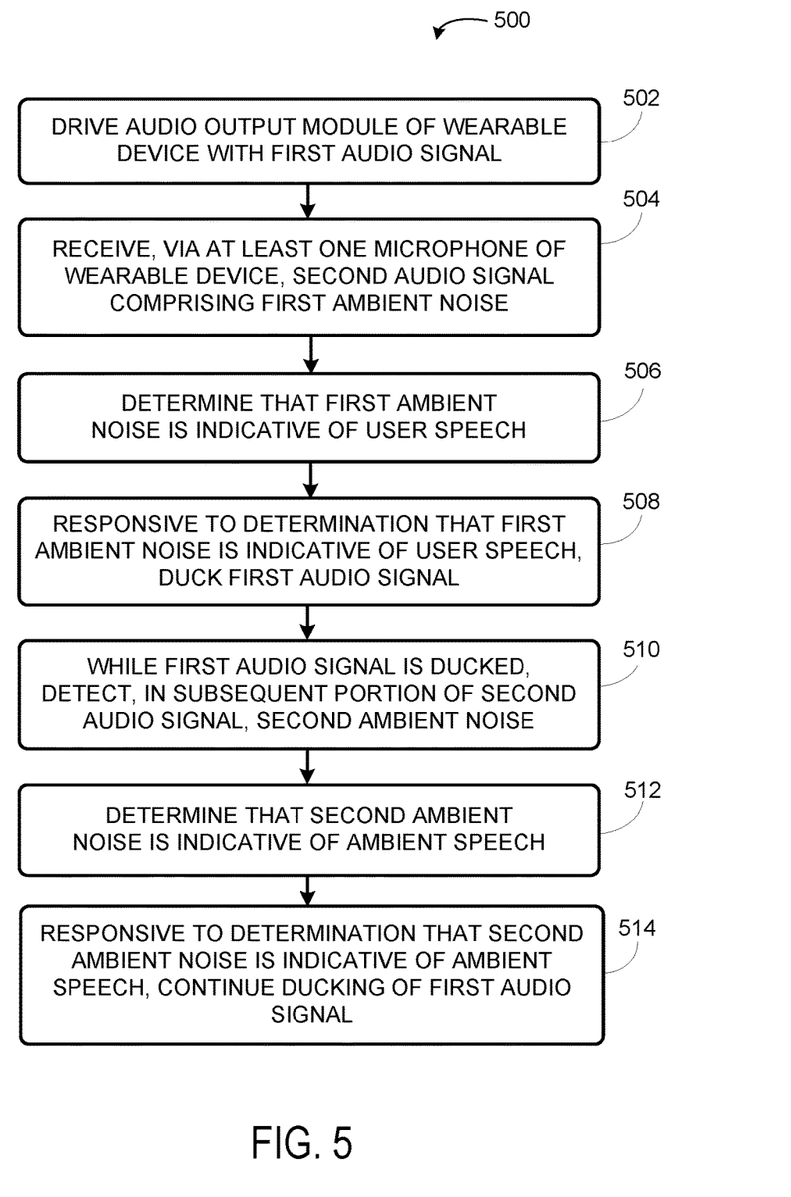
FIG. 5 is a flowchart, according to an example implementation.

Flow chart 500, shown in FIG. 5, presents example operations that may be implemented by a wearable device. Flow chart 500 may include one or more operations or actions as illustrated by one or more of the blocks shown in each figure. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 502, the wearable device may drive an audio output module with a first audio signal. The wearable device may be represented by, for example, the device 300 shown in FIG. 3 and the wearable computing device 430 shown in FIG. 4. Accordingly, the audio output module may be the BCTs 308. Other wearable devices, such as the devices shown in FIGS. 1-2 are also possible, as are other audio output modules, such as ear buds, headphones, or other micro-speakers, as discussed above.

The first audio signal may be provided by an audio source that is included in the device 300, such as an internal audio playback device. The audio signal may alternatively be provided by an auxiliary audio playback device, such as a smartphone, that is connected to the device 300 through either a wired or a wireless connection. Other possibilities also exist. The first audio signal may include, for example, music content that is played back to the user of the device 300 via the BCTs 308, providing the user with a private listening experience.

In some situations, the user may wish to adjust a volume of the music content that is played back from the first audio signal. For example, the user may wish to lower the volume if she becomes engaged in a conversation with another person, so that she can hear the other person more clearly. As discussed above, it can be cumbersome and repetitive to manually adjust a volume or play/pause control on the device 300 or an auxiliary audio playback device. Therefore, the device 300 may detect when such volume adjustments may be desirable, and may duck the audio content accordingly. For example, the device 300 may detect the ambient noise around the user and responsively lower the volume when an indication of speech is detected, as this may indicate that the user has entered a conversation.

Accordingly, at block 504, while driving the audio output device with the first audio signal, the device 300 may receive, via at least one microphone of the wearable device, a second audio signal. The second audio signal may include first ambient noise, such as the noise in the user's environment. The first ambient noise may include, for instance, the speech of the user and others around the user. The device 300 may perform a spectral analysis of the first ambient noise and determine that the frequency and timing of the first ambient noise is consistent with typical human speech patterns. In some embodiments, the device may determine that a signal-to-noise ratio of the first ambient noise is above a threshold ratio, which may indicate that the noise is likely to be speech. Other examples and analyses for speech recognition are also possible.

However, detecting any indication of speech in the user's environment may sometimes result in the device 300 ducking the first audio signal in situations where the user would not have done so manually. For instance, the user may be on a crowded train, surrounded by people who may be speaking in fairly close proximity to the user, yet not to the user. In this situation, if the device 300 is configured to "listen" for speech in the environment in general, or even speech that may have a directional component pointed toward the user, determined via a microphone array, it may incorrectly determine that the user has entered a conversation. As a result of this false positive determination, the device 300 may duck the playback volume at a time when the user prefers a private listening experience.

Therefore, the device 300 may be configured to initiate ducking of the first audio signal in response to a determination that the first ambient noise is indicative of speech by the user. At block 506, the device 300 may determine that the first ambient noise is indicative of user speech in a number of ways. For instance, one or more omni-directional microphones in the device 300 may be used to detect the first ambient noise. Because of the proximity of the device 300 and the microphone(s) to the user's mouth, it may be expected that the sound of the user's speech may be more clearly received via the microphone than other ambient noises. Therefore, the device 300 may use a relatively high threshold for the determined signal-to-noise ratio of the first ambient noise before it will initiate ducking.

In some examples, the device 300 may include a microphone array that directs a listening beam toward the user of the wearable device. As shown in FIG. 3, the microphones 312 may, through their orientation and associated sound processing algorithm(s), direct a listening beam 316 toward the user's mouth 350. This may allow the device 300 to detect noises that originate from the direction of the user's mouth 350 even more clearly than other ambient noises surrounding the user, and may allow the device 300 to identify an indication of user speech more accurately. For example, the configuration of the microphones 312 and corresponding directional sound processing algorithm(s) may allow the device 300 to use an even higher threshold for the determined signal-to-noise ratio, reducing the occurrence of false positives.

In some situations, a false positive determination to initiate ducking of the first audio signal may occur even though the 300 accurately identified the user's speech. For instance, the user may say something yet not intend to enter into a conversation, and may not desire to adjust the volume of their music playback. As one example, the user may make a polite remark such as "Excuse me" or "Thank you" that does not invite a response, and does not require the user to leave a private music listening experience. Similarly, the user may greet another person briefly, by saying simply "Hi", which may indicate that the greeting is only in passing.

Conversely, user speech that has a slightly longer duration may be more indicative of the beginning of a conversation, or at least indicative of the user's desire to duck the first audio signal. For example, the user may greet another person with an invitation to begin a conversation, such as "Hey, how have you been?" Further, the user may notice that another person is initiating a conversation with her, and may respond by saying "I'm sorry, can you repeat that?" To account for such situations, the device 300 may determine that the first ambient noise that is indicative of user speech has a duration that is greater than a threshold duration. The threshold duration may be relatively short, around one to two seconds, for example. This may result in the device 300 essentially ignoring instances of user speech that is short and more likely to be non-conversational, as discussed above.

At block 508, responsive to the determination that the first ambient noise is indicative of user speech, the wearable device 300 may duck the first audio signal. As noted above, in some situations the ducking may further be responsive to the determination that the signal-to-noise ratio of the first ambient noise is greater than a threshold ratio, and that the determined user speech has a duration greater than a threshold duration. Additionally, ducking the first audio signal has been discussed in examples thus far as a volume attenuation of the first audio signal, such as music playback. However, ducking of the first audio signal might not be limited to volume attenuation. For instance, ducking the first audio signal may involve pausing playback of the first audio signal.

The device 300 may duck the first audio signal temporarily, such that the first audio signal will eventually resume to its previous playback state. In some cases, the ducking may initiated and last for a predetermined length of time, such as five seconds. When the predetermined time elapses, the device 300 may discontinue ducking of the first audio signal. Alternatively, the length of the ducking may be extended if additional user speech is detected, or if other ambient speech is detected as discussed in the following paragraphs.

After the first audio signal is ducked, it may be desirable for the device 300 to continue ducking based not only on the user's speech, but on the speech of those that the user may be conversing with. Although initiating ducking based on the user's speech may reduce the instance of false positive ducking decisions, determining whether to continue ducking of the first audio signal based only on the user's speech may lead to false negative decisions. For example, the user may initiate a conversation that has relatively lengthy periods where the other person is speaking, rather than the user. If the device 300 is basing all ducking determinations (e.g., both to initiate and to continue ducking) on the user only, the predetermined time for ducking may elapse while the other person is speaking, which may undesirably increase the volume of the user's music mid-conversation. Further, predicting and adjusting, ex ante, the predetermined length of time that the ducking should last after the user speaks might not be feasible, as the length and pace of the user's conversations may vary widely.

Therefore, at block 510, while the first audio signal is ducked, the device 300 may detect, in a subsequent portion of the second audio signal, second ambient noise. In this situation, once the first audio signal is already ducked in response to the user's speech, the device 300 may "listen" for not only the user's speech, but for the ambient speech of others as well. The device 300 may accomplish this by relaxing the criteria by which it identifies speech within the second audio signal. For example, the device 300 may determine that the second ambient noise has a signal-to-noise ratio that is higher than a second threshold that is distinct from the first threshold that was used to determine user speech. Further, the first threshold may be greater than the second threshold.

Further, the microphones 312 and their associated sound-processing algorithm(s) may transition to an omni-directional detection mode when the first audio signal is ducked. Although the microphones 312 may be oriented in a configuration that is favorable for directional listening toward the user's mouth 350, they may still provide omni-directional detection based on, for example, the energy levels detected at each microphone for the second audio signal.

At block 512, the device 300 may determine that the second ambient noise is indicative of ambient speech. At block 514, responsive to the determination that the second ambient noise is indicative of ambient speech, the device 300 may continue the ducking of the first audio signal. Because the criteria for determining ambient speech are more easily satisfied than those for determining user speech, the device 300 may identify both user speech and the speech of the user's conversation partner(s) in the second ambient noise as ambient speech. Thus, the device 300 may continue ducking the first audio signal based on either determination, which may allow the device 300 to maintain the ducking for the duration of the user's conversation.

The device 300 may continue ducking the audio signal by extending the predetermined ducking time. For instance, the device 300 may extend the predetermined time by resetting it to its original length time after each determination of ambient speech. In this way, a countdown to the end of ducking may be repeatedly restarted each time the device 300 determines an indication of ambient speech while the first audio signal is still ducked. Further, the predetermined length of time may additionally or alternatively be adjusted based on the length of the conversation. For instance, the predetermined length of time for ducking may initially be five seconds. If the device 300 determines enough ambient speech such that the first audio signal remains ducked for a threshold duration, such as one minute, for example, it may indicate that the user is engaged in an important and perhaps lengthy conversation. Accordingly, the device 300 may increase the predetermined length of time that ducking will last in the absence of ambient speech, for instance, from five seconds to ten seconds, to allow for longer pauses in the conversation.

Similarly, the nature of the ducking of the first audio signal may be adjusted by the device 300 while the first audio signal is ducked. For example, the ducking may be initiated as a volume attenuation, and may be continued as a volume attenuation as ambient speech is detected. However, if the ducking is continued for longer than a threshold duration, such as one minute, the device 300 may adjust the ducking to pause the first audio signal. Other possibilities exist, and may include adjusting the degree of volume attenuation based on the detected signal-to-noise ratio of a given signal, or the duration of a conversation, among other factors.

Further, in some embodiments, ducking of the first audio signal may include a volume attenuation that is more tailored than a global gain shift across the entire frequency response of the audio output device. For example, the device 300 may determine a frequency content of the second ambient noise that is indicative of ambient speech. Then, the device 300 may duck the first audio signal by adjusting the frequency response of the audio output device based on the determined frequency content of the second ambient noise. In other words, the device 300 may determine what portions (e.g., frequency range(s)) of the first audio signal are most likely to interfere with the user's ability to hear the ambient speech, based on the characteristics of the ambient speech. The device may then attenuate only those portions of the first audio signal.

In some embodiments, the device's determination to duck the first audio signal may also have a contextual component. The device 300 may detect, via at least one sensor of the device 300, a contextual indication of a user activity. The device 300 may then base the determination of user speech, ambient speech, or both, on the detected activity.

For instance, one or more sensors on the device 300 may detect the user's position and the time of day, indicating that the user is likely commuting on a train. This context may affect how the wearable device identifies speech within the second audio signal. For example, a crowded train may be characterized by a second audio signal that includes multiple indications of speech, each with a relatively low signal-to-noise ratio. Accordingly, the device 300 may, when it detects that the user is on the train, require the signal-to-noise ratio of any detected speech to surpass a given threshold before any ducking of the first audio signal is initiated.

Conversely, the device 300 may detect that the user is at her office, which may generally be a quieter setting. In this situation, the device 300 may have a lower threshold for the signal-to-noise ratio of detected speech.

In some examples, the device 300 may also be configured the duck the first audio signal in response to the detection and identification of certain, specific sounds, in addition to user speech. For example, the device 300 may detect in the second audio signal an indication of an emergency siren, such as the siren of an ambulance or fire truck. The device 300 may responsively duck the first audio signal to increase the user's aural awareness.

In some implementations, the device 300 may be configured to increase the volume of the first audio signal in situations where the user might desire to do so, such as in the presence of loud ambient noises. For example, while the first audio signal is not ducked, the device 300 may detect in a portion of the second audio signal a third ambient noise. The device may further determine that the third ambient noise is not indicative of user speech, and that it has greater than a threshold intensity. Responsive to these two determinations, the device 300 may increase the volume of the first audio signal. In this way, the device 300 may both decrease, via ducking, and increase the volume of the first audio signal in realtime, based on the ambient noises detected in the user's environment. This may further reduce the need for a user to manually adjust the volume or play/pause controls of the device 300.

V. Conclusion

While various implementations and aspects have been disclosed herein, other aspects and implementations will be apparent to those skilled in the art. The various implementations and aspects disclosed herein are for purposes of illustration and are not intended to be limiting, with the scope being indicated by the following claims.

We claim:

1. A method comprising:
    driving an audio output module of a wearable device with a first audio signal;
    operating the wearable device in a first mode in which ducking is initiated in response to speech by the wearer and not in response to speech by speakers other than the wearer;
    while operating in the first mode, receiving, via at least one microphone of the wearable device, a second audio signal comprising first ambient noise; and
    determining that the first ambient noise is indicative of user speech by a wearer of the wearable device and responsively ducking the first audio signal and switching the wearable device to operate a second mode, wherein operating in the second mode comprises:
        while the first audio signal is ducked, detecting, in a subsequent portion of the second audio signal, second ambient noise;
        determining that the second ambient noise is indicative of ambient speech by a wearer of the wearable device or another speaker; and
        responsive to the determination that the second ambient noise is indicative of ambient speech by the wearer or another speaker, continuing the ducking of the first audio signal.

2. The method of claim 1, wherein ducking the first audio signal comprises at least one of the following two actions: attenuating a volume of the first audio signal and pausing playback of the first audio signal.

3. The method of claim 1, wherein ducking the first audio signal comprises ducking for a predetermined length of time, and wherein continuing the ducking of the audio content comprises extending the predetermined length of time for an additional amount of time.

4. The method of claim 3, further comprising:
    responsive to the predetermined length of time elapsing, discontinuing the ducking of the first audio signal.

5. The method of claim 1, further comprising:
    detecting, in a portion of the second audio signal while the first audio signal is not ducked, third ambient noise;
    determining that the third ambient noise is not indicative of user speech;
    determining that the third ambient noise has greater than a threshold intensity; and
    based on the determination that the third ambient noise i) is not indicative of user speech and ii) has greater than the threshold intensity, increasing a volume of the first audio signal.

6. The method of claim 1, wherein the at least one microphone comprises a microphone array, and wherein the method further comprises directing, by the microphone array, a listening beam toward an expected location of a mouth of the wearer, when the wearable device is worn.

7. The method of claim 1, wherein determining that the first ambient noise is indicative of user speech further comprises determining that a signal-to-noise ratio of the first ambient noise is above a threshold ratio, and wherein ducking the first audio signal is further based on the determination that the signal-to-noise ratio is above the threshold ratio.

8. The method of claim 7, wherein the signal-to-noise ratio is a first signal-to-noise ratio, wherein the threshold ratio is a first threshold ratio, and wherein determining that the second ambient noise is indicative of ambient speech comprises determining that a second signal-to-noise ratio of the second ambient noise is above a second threshold ratio, wherein the first threshold ratio is greater than the second threshold ratio.

9. The method of claim 1, further comprising:
    detecting, via at least one sensor of the wearable device, a contextual indication of a user activity, wherein ducking the first audio signal is further based on the detected contextual indication of the user activity.

10. The method of claim 1, wherein, during operation in the second mode, ducking is continued in response to speech by the wearer or speech by another speaker greater than a threshold volume.

11. A wearable device comprising:
    an audio output module;
    at least one microphone;
    a processor;
    a non-transitory computer readable medium; and
    program instructions stored on the non-transitory computer readable medium that, when executed by the processor, cause the wearable device to perform operations comprising:
        driving the audio output module with a first audio signal;
        causing the wearable device to operate in a first mode, wherein ducking is initiated in response to speech by the wearer and not in response to speech by speakers other than the wearer;
        while operating in the first mode, receiving, via the at least one microphone, a second audio signal comprising first ambient noise; and
        determining that the first ambient noise is indicative of user speech by a wearer of the wearable device and responsively causing the wearable device to switch to a second mode and ducking the first audio signal, wherein operation in the second mode comprises:
            while the first audio signal is ducked, detecting, in a subsequent portion of the second audio signal, second ambient noise;
            determining that the second ambient noise is indicative of ambient speech by the wearer of the wearable device or another speaker; and responsive to the determination that the second ambient noise is indicative of ambient speech by the wearer of the wearable device or another speaker, continuing the ducking of the first audio signal.

12. The wearable device of claim 11, wherein ducking the first audio signal comprises at least one of the following two actions: attenuating a volume of the first audio signal and pausing playback of the first audio signal.

13. The wearable device of claim 11, wherein ducking the first audio signal comprises ducking for a predetermined length of time, and wherein continuing the ducking of the audio content comprises extending the predetermined length of time for an additional amount of time.

14. The wearable device of claim 13, further comprising:
responsive to the predetermined length of time elapsing, discontinuing the ducking of the first audio signal.

15. The wearable device of claim 11, wherein the program instructions, when executed by the processor, further cause the wearable device to perform functions comprising:
determining that the first ambient noise is not indicative of user speech;
determining that the first ambient noise has greater than a threshold intensity; and
based on the determination that the first ambient noise i) is not indicative of user speech and ii) has greater than the threshold intensity, increasing a volume of first audio signal.

16. The wearable device of claim 11, wherein the at least one microphone comprises a microphone array, and wherein the program instructions, when executed by the processor, further cause the wearable device to perform functions comprising directing, by the microphone array, a listening beam toward an expected location of a mouth of the wearer, when the wearable device is worn.

17. The wearable device of claim 11, wherein determining that the first ambient noise is indicative of user speech further comprises determining that a signal-to-noise ratio of the first ambient noise is above a threshold ratio, and wherein ducking the first audio signal is further based on the determination that the signal-to-noise ratio is above the threshold ratio.

18. The wearable device of claim 17, wherein the signal-to-noise ratio is a first signal-to-noise ratio, wherein the threshold ratio is a first threshold ratio, and wherein determining that the second ambient noise is indicative of ambient speech comprises determining that a second signal-to-noise ratio of the second ambient noise is above a second threshold ratio, wherein the first threshold ratio is greater than the second threshold ratio.

19. The wearable device of claim 11, wherein the program instructions, when executed by the processor, further cause the wearable device to perform functions comprising:
detecting, via at least one sensor of the wearable device, a contextual indication of a user activity, wherein ducking the first audio signal is further based on the detected contextual indication of the user activity.

20. A non-transitory computer readable media having instructions stored thereon, wherein the instructions comprise instructions for:
driving an audio output module of a wearable device with a first audio signal;
causing the wearable device to operate in a first mode in which ducking is initiated in response to speech by the wearer and not in response to speech by speakers other than the wearer:
while operating in the first mode, receiving, via at least one microphone of the wearable device, a second audio signal comprising first ambient noise;
determining that the first ambient noise is indicative of user speech by a wearer of the wearable device and responsively ducking the first audio signal and causing the wearable device to switch to a second mode, wherein operation in the second mode comprises:
while the first audio signal is ducked, detecting, in a subsequent portion of the second audio signal, second ambient noise;
determining that the second ambient noise is indicative of ambient speech by the wearer of the wearable device or another speaker; and
responsive to the determination that the second ambient noise is indicative of ambient speech by the wearer or another speaker, continuing the ducking of the first audio signal.

21. The non-transitory computer readable media of claim 20, wherein ducking the first audio signal comprises ducking for a predetermined length of time, and wherein continuing the ducking of the audio content comprises extending the predetermined length of time for an additional amount of time.

* * * * *